(12) United States Patent
Hopt

(10) Patent No.: US 10,902,224 B2
(45) Date of Patent: Jan. 26, 2021

(54) MANIPULATION-PROOF CARD READER WITH A MULTILAYERED ADHERED PROTECTIVE HOOD

(71) Applicant: ddm hopt + schuler GmbH & Co. KG, Rottweil (DE)

(72) Inventor: Karl-Rudolf Hopt, Rottweil (DE)

(73) Assignee: ddm hopt + schuler GmbH & Co. KG, Rottweil (DE)

( * ) Notice: Subject to any disclaimer, the term of this patent is extended or adjusted under 35 U.S.C. 154(b) by 0 days.

(21) Appl. No.: 16/872,007

(22) Filed: May 11, 2020

(65) Prior Publication Data

US 2020/0364414 A1 Nov. 19, 2020

(30) Foreign Application Priority Data

May 13, 2019 (EP) ..................... 19174105

(51) Int. Cl.
*G06K 7/00* (2006.01)

(52) U.S. Cl.
CPC ......... *G06K 7/0021* (2013.01); *G06K 7/0056* (2013.01)

(58) Field of Classification Search
None
See application file for complete search history.

(56) References Cited

U.S. PATENT DOCUMENTS

| 5,877,488 | A | * | 3/1999 | Klatt | .................... G06K 7/0021 |
| | | | | | 235/486 |
| 6,355,316 | B1 | | 3/2002 | Miller et al. | |
| 2012/0062241 | A1 | | 3/2012 | Rossi et al. | |
| 2017/0213055 | A1 | * | 7/2017 | Hopt | .................... G06K 7/0021 |

FOREIGN PATENT DOCUMENTS

| DE | 10 2009 026 466 B3 | 7/2010 |
| DE | 10 2010 003 655 A1 | 11/2010 |
| DE | 10 2012 203 474 A1 | 9/2013 |
| EP | 1 054 316 A1 | 11/2000 |
| EP | 1 785 911 A1 | 5/2007 |
| EP | 3 196 799 A1 | 7/2017 |
| JP | H 11 31353 A | 2/1999 |

* cited by examiner

*Primary Examiner* — Kristy A Haupt
(74) *Attorney, Agent, or Firm* — Hackler Daghighian Martino & Novak

(57) ABSTRACT

A card reader for interchanging data with a chip card includes a card insertion opening, a contact-making unit for interchanging data with a chip card which is inserted into the card reader through the card insertion opening, and a protective hood which covers the contact-making unit except for the card insertion opening. The protective hood is formed from two sheet-metal hoods which are stacked one in the other and an anti-drilling foil which is arranged between the said sheet-metal hoods and has an area-covering anti-drilling conductor track structure. The two sheet-metal hoods and the anti-drilling foil are adhesively bonded to one another over their full surface area to form a composite cover.

14 Claims, 3 Drawing Sheets

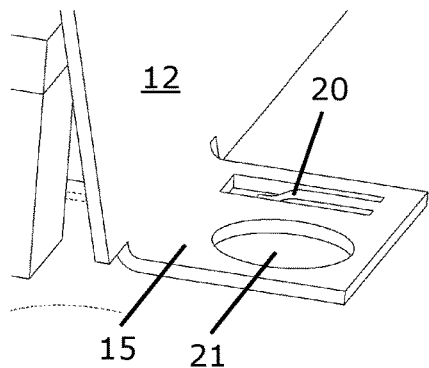
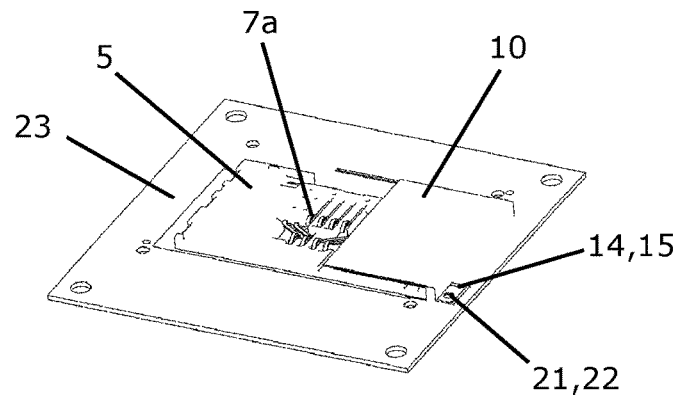
Fig. 4    Fig. 5
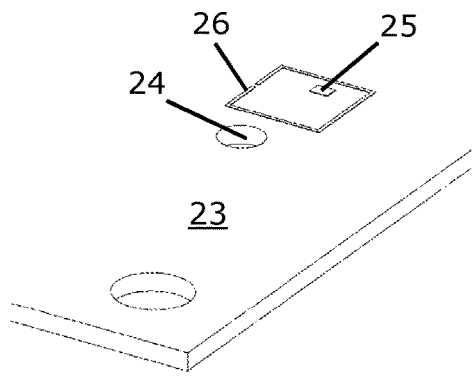
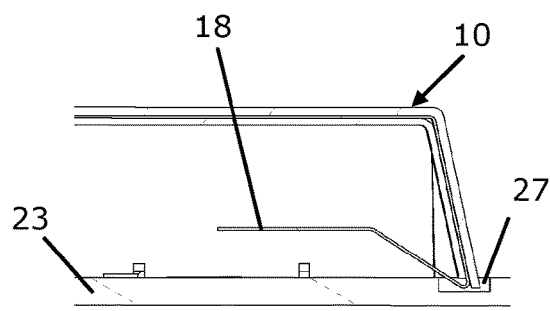
Fig. 6    Fig. 7

MANIPULATION-PROOF CARD READER WITH A MULTILAYERED ADHERED PROTECTIVE HOOD

CROSS-REFERENCE TO RELATED APPLICATIONS

This application claims priority to the European Patent Application EP 19 174 105.7 filed on May 13, 2019, the entire contents of which are hereby incorporated in full by this reference.

DESCRIPTION

Field of the Invention

The present invention relates to a card reader for interchanging data with a chip card, comprising a card insertion opening, a contact-making unit for interchanging data with a chip card which is inserted into the card reader through the card insertion opening, and a protective hood which covers the contact-making unit except for the card insertion opening and which has an area-covering anti-drilling conductor track structure with at least one continuous anti-drilling conductor track.

Background of the Invention

A card reader of this kind has been disclosed, for example, by DE 10 2009 026 466 B3.

This known card reader comprises a plastic injection-moulded part in the form of a protective hood with an anti-drilling conductor track structure provided on it. The protective hood is an injection-moulded plastic part which, on its inner side, has a metallized meandering conductor track structure as an anti-drilling arrangement. To this end, a meandering track structure (approximately 0.15 mm track width) with a spacing of approximately 0.25 mm was ablated by a laser from the inner side over the full surface area or area-covering. After this laser structuring, the plastic part was metallized. A continuous electrical conductor track is placed on the entire inner side between two connection contacts owing to the now metallized anti-drilling conductor track structure. If the protective hood is drilled or ground down for manipulation purposes, the continuous conductor track across which a current flows during operation is also severed in the process. This is identified by a monitoring unit which then no longer permits a reading process and/or takes the card reader out of operation. However, the laser structuring and the subsequent metallization are complicated and therefore also associated with corresponding costs.

SUMMARY OF THE INVENTION

In this respect, the object of the present invention is to provide a protective hood in a card reader of the kind mentioned in the introductory part with a lower level of complexity and with lower costs.

According to the invention, this object is achieved in that the protective hood is formed from two sheet-metal hoods which are stacked one in the other and an anti-drilling foil which is arranged between the said sheet-metal hoods and has the extensive anti-drilling conductor track structure, wherein the two sheet-metal hoods and the anti-drilling foil are adhesively bonded to one another over their full surface area to form a composite cover.

According to the invention, the protective hood is bonded over the full surface area both to the inner side of the outer sheet metal hood and also to the outer side of the inner sheet metal hood in order to thereby form an adhesively bonded, non-releasable, multilayer composite cover. If the protective hood is drilled for manipulation purposes, the anti-drilling conductor track which was continuous up until that point or the anti-drilling conductor track structure which was closed up until that point is necessarily interrupted as a result. This electrical circuit interruption is identified by a monitoring unit which then no longer permits a reading process and/or takes the contact-making unit out of operation.

The sheet-metal hoods are preferably each designed as a deep-drawn part or a bent sheet-metal part.

The anti-drilling foil preferably has a connection lug which projects out of the protective hood and is electrically connected to the contact carrier within the protective hood. An interruption in the anti-drilling conductor track structure can be forwarded by means of the contact carrier to the monitoring unit on a printed circuit board on which the card reader is mounted.

The two sheet-metal hoods preferably each have feet for fastening on a printed circuit board, wherein the feet of the outer sheet-metal hood in each case completely engage over the feet of the inner sheet-metal hood.

Provision is particularly preferably made for the card reader to be mounted on a printed circuit board, and for electrical contact to be made with electrical connection contacts of the protective hood by corresponding mating contacts of the printed circuit board. If the protective hood is lifted away from the printed circuit board for manipulation purposes, the electrical contact between connection contacts and the printed circuit board is necessarily interrupted as a result and consequently the electrical circuit which was closed up until that point is interrupted. This is also identified by the monitoring unit which then no longer permits a reading process and/or takes the contact-making unit out of operation.

In an advantageous development, the connection contacts are formed by tabs which are cut out from the standing surface of the feet and project beyond the standing surface.

The anti-drilling foil can have a single-layer or a multi-layer anti-drilling conductor track structure.

The invention also relates to a protective hood for a card reader with two sheet-metal hoods which are stacked one in the other and with an anti-drilling foil which is arranged between the said sheet-metal hoods and has an area-covering anti-drilling conductor track structure with at least one continuous anti-drilling conductor track, wherein the two sheet-metal hoods and the anti-drilling foil are adhesively bonded to one another over their full surface area to form a composite cover.

Further advantages of the invention are evident from the description, the claims and the drawing. The features mentioned above and those presented further can likewise be used in each case by themselves or as a plurality in any desired combinations. The embodiment shown and described should not be understood as an exhaustive list, but rather is of exemplary character for portraying the invention.

BRIEF DESCRIPTION OF THE DRAWINGS

In the drawing:

FIG. 4 shows a view of a detail of a foot of the inner sheet-metal hood;

FIG. 5 shows the card reader which is mounted on a printed circuit board, wherein the protective hood is illustrated in a broken-off manner;

FIG. 6 shows the region of the printed circuit board on which the protective hood stands by way of the feet of its two sheet-metal hoods; and FIG. 7 shows a sectional view of the printed circuit board with a mounted protective hood in the region of a connection lug of the protective hood.

DETAILED DESCRIPTION OF THE PREFERRED EMBODIMENTS

Figure 1A:
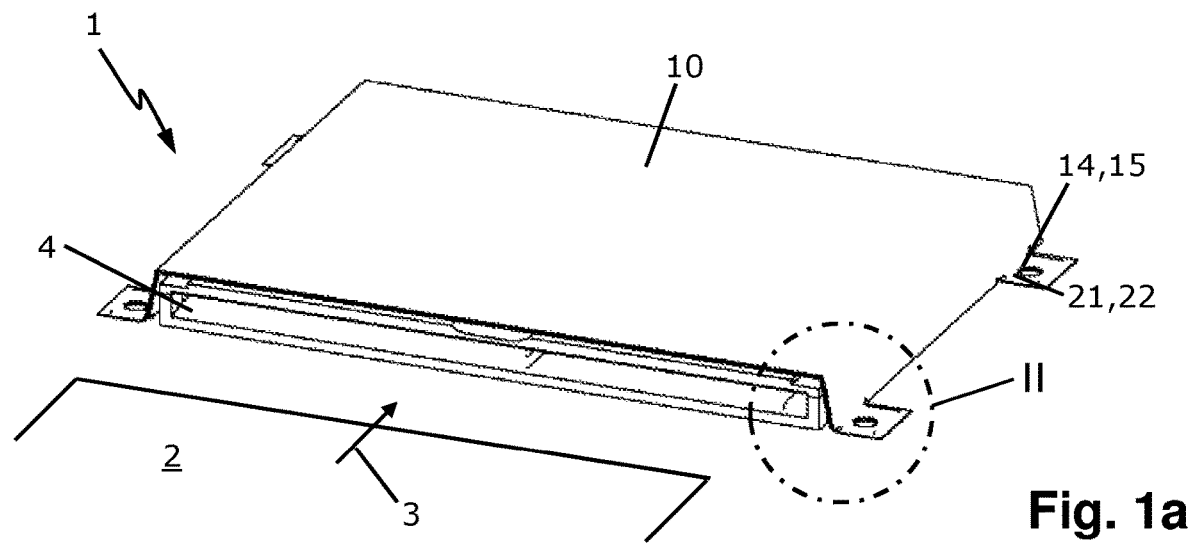
FIGS. 1 *a*, 1 *b* show a perspective view of the card reader according to the invention with a protective hood from above (FIG. 1*a*) and from below (FIG. 1*b*)
Figure 1B:
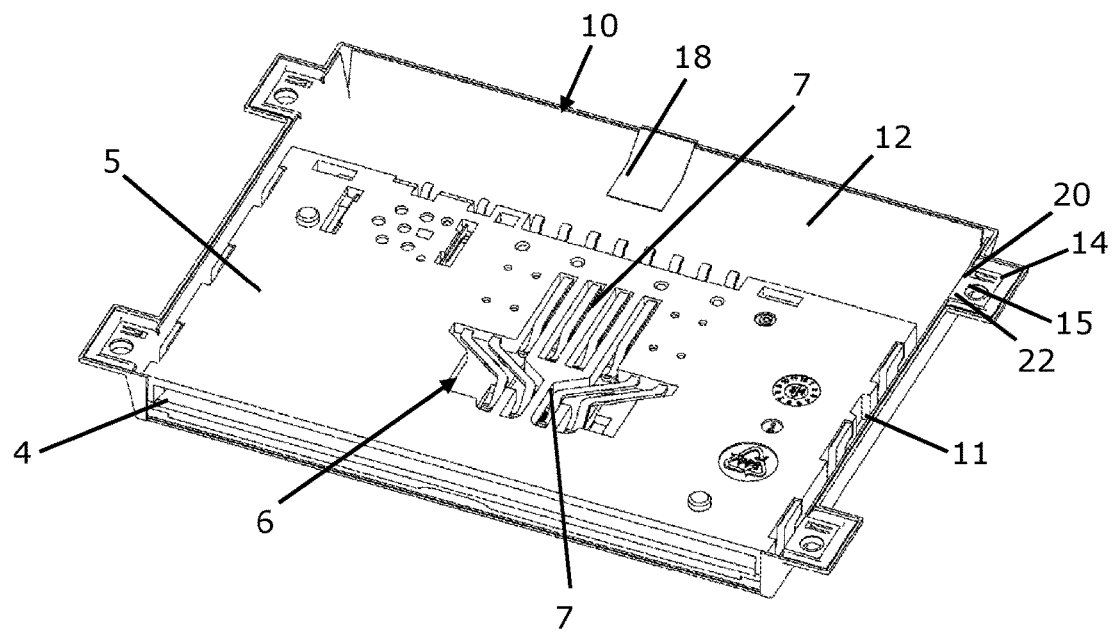

The card reader 1 shown in FIGS. 1a, 1b is a so-called push/pull card reader in the case of which a chip card 2 is inserted into the card reader 1 up to the data interchange position by the user in the insertion direction 3 via a card insertion opening 4 and is withdrawn from the card reader 1 again by the user after the data interchange operation. The chip card 2 is fitted with a microchip (not shown) for storing data, the contacts of the said microchip being provided as electrical contact areas (not shown) on the card surface.

The card reader 1 has a contact carrier 5 with a contact-making unit 6 for interchanging data with the chip card 2 which is inserted through the card insertion opening 4. The contact-making unit 6 comprises a plurality of elastically deformable contact springs 7 which protrude into the card path by way of their free contact ends 7a (FIG. 5). The free contact ends 7a are deflected out of the card path by the inserted chip card 2 and make contact with the electrical contact areas of the chip card 2. Except for the card insertion opening 4, the contact carrier 5 is covered by a protective hood 10.

Figure 2:
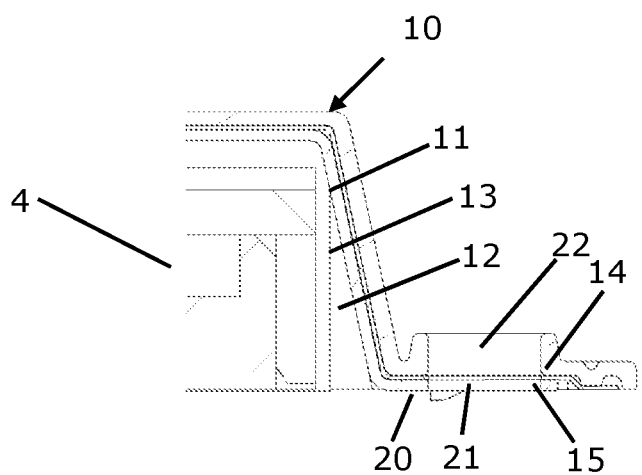
FIG. 2 shows a view of a detail according to II in FIG. 1a of the protective hood which is composed of two sheet-metal hoods which are stacked one in the other.

As shown in FIG. 2, the protective hood 10 is formed from two trough-like sheet-metal hoods 11, 12 which are stacked one in the other and from a flexible anti-drilling foil 13 which is arranged between the said sheet-metal hoods. The outer sheet-metal hood 11 may be, for example, a deep-drawn part and the inner sheet-metal hood 12 may be a bent sheet-metal part. The anti-drilling foil 13 is bonded over the full surface area both to the inner side of the outer sheet-metal hood 11 and also to the outer side of the inner sheet-metal hood 12 by means of adhesive layers 13d (FIG. 3b) on both outer sides of said foil in order to thereby form an adhesively bonded, non-releasable composite cover. The adhesive layers 14 can be formed, for example, in each case by a double-sided adhesive strip. The two sheet-metal hoods 11, 12 each have four feet 14, 15, wherein the feet 14 of the outer sheet-metal hood 11 in each case completely cover or engage over the feet 15 of the inner sheet-metal hood 12.

Figure 3A:
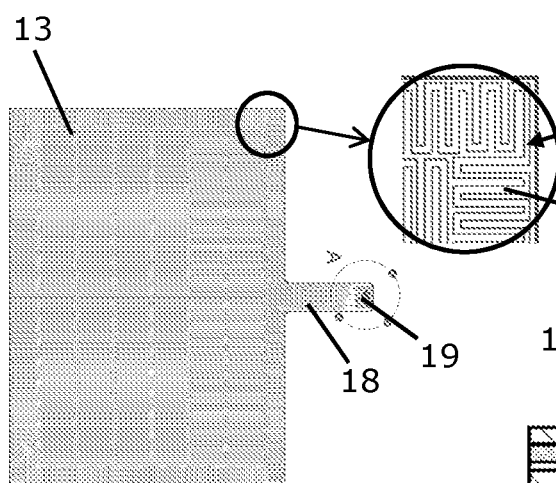
FIGS. 3a, 3b show a plan view (FIG. 3a) and a longitudinal section (FIG. 3b) of an anti-drilling foil which is adhesively bonded between the two sheet-metal hoods.
Figure 3B:
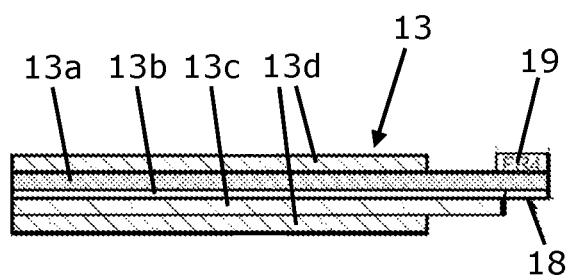

As shown in FIG. 3a, the anti-drilling foil 13 has, over its extent, an anti-drilling conductor track structure 16 in the form of two continuous, meandering anti-drilling conductor tracks 17, the line width of which is at most 0.2 mm and the line spacing of which in relation to one another is at most 0.3 mm. The conductor tracks 17 end on a flexible connection lug 18 of the anti-drilling foil 13 in four exposed, electrical contact areas (pads) 19. As shown in FIG. 3b, the anti-drilling foil 13 is constructed in multilayer form from a carrier foil 13a, a conductor track structure 13b, for example composed of silver ink, which is applied to the said carrier foil, a covering foil (insulation, dielectric) 13c which covers the conductor track structure 13b, and the two adhesive layers 13d. Rather than the single-layer design as shown, the anti-drilling foil 13 can also be of multilayer design. In this case, a further conductor track structure, for example composed of silver ink, is applied to the (inner) covering foil 13c and is covered by a further, outer covering foil (insulation, dielectric), i.e. the further conductor track structure and the outer covering foil are arranged between the covering foil 13c and the adhesive layer 13d.

The foot 15, shown in detail in FIG. 4, of the inner sheet-metal hood 12 has a connection contact 20, here in the form of a tab which is cut out from the standing surface of the foot 15 merely by way of example, which projects downward beyond the standing surface. The standing surface of the foot 15 further has a fastening hole 21. The foot 14 of the outer sheet-metal hood 11 likewise has a fastening hole 22 which, together with the fastening hole 21, forms a continuous fastening hole.

As shown in FIG. 5, the contact carrier 5 is first soldered onto a printed circuit board 23. The connection lug 18, which projects out of the protective hood 10, of the anti-drilling foil 13 is inserted into a plug of the contact carrier 5 and then the protective hood 10 is fastened to the printed circuit board 23 over the contact carrier 5 by way of four screws which pass through the fastening holes 21, 22 of the protective hood 10 and fastening holes 24 (FIG. 6) of the printed circuit board 23. In this case, the connection contact 20, on the printed circuit board 23, makes contact with an exposed, electrical contact area 25 which is surrounded by a protective ring (potential ring, guard ring) 26 for protection against creepage currents. In order to ensure that the protective hood 10 rests on the printed circuit board 23 all the way around without a gap in spite of the inwardly bent-over connection lug 18, the printed circuit board 23 has a cutout 27 for the connection lug 18 which is bent over therein (FIG. 7). In the region of the cutout 27, the outer sheet-metal hood 11 is extended up to the base of the cutout 27 in order to prevent any access into the interior of the protective hood 10.

If the protective hood 10 is drilled or ground down from the outside for manipulation purposes, its anti-drilling conductor track structure 16 across the conductor tracks 17 of which a current flows during operation is necessarily destroyed as a result, and consequently the electrical circuit which was closed up until that point is interrupted. This is identified by a monitoring unit (not shown) of the printed circuit board 23 which then no longer permits a reading process and/or takes the contact-making unit 6 out of operation.

If the protective hood 10 is lifted away from the printed circuit board 23 for manipulation purposes, the electrical contact between the connection contact 20 of the protective hood 10 and the contact area 25 of the printed circuit board 23 is necessarily interrupted as a result, and consequently the electrical circuit which was closed up until that point is interrupted. This is also identified by the monitoring unit which then no longer permits a reading process and/or takes the contact-making unit 6 out of operation. Therefore, unnoticed manipulation of the card reader 1 is not possible, as a result of which a "secure card reader" is provided.

What is claimed is:

1. A card reader for interchanging data with a chip card, comprising:
   a card insertion opening;

a contact-making unit for interchanging data with a chip card which is inserted into the card reader through the card insertion opening; and a protective hood which covers the contact-making unit except for the card insertion opening and which has an area-covering anti-drilling conductor track structure with at least one continuous anti-drilling conductor track;

wherein the protective hood is formed from two sheet-metal hoods which are stacked one in the other and an anti-drilling foil which is arranged between the sheet-metal hoods and has the area-covering anti-drilling conductor track structure;

wherein the two sheet-metal hoods and the anti-drilling foil are adhesively bonded to one another over their full surface area to form a composite cover.

2. The card reader according to claim 1, wherein the sheet-metal hoods are each designed as a deep-drawn part or a bent sheet-metal part.

3. The card reader according to claim 1, wherein the anti-drilling foil has a connection lug which projects out of the protective hood and is electrically connected to a contact carrier within the protective hood.

4. The card reader according to claim 1, wherein the two sheet-metal hoods each have feet for fastening on a printed circuit board, wherein the feet of the outer sheet-metal hood engage in each case completely over the feet of the inner sheet-metal hood.

5. The card reader according to claim 4, wherein the connection contacts are formed by tabs which are cut out from the standing surface of the feet of the inner sheet-metal hood and project beyond the standing surface.

6. The card reader according to claim 1, wherein the card reader is mounted on a printed circuit board, and wherein electrical contact is made with electrical connection contacts of the protective hood by corresponding mating contacts of the printed circuit board.

7. A protective hood for a card reader, comprising:

two sheet-metal hoods which are stacked one in the other and comprising an anti-drilling foil which is arranged between the sheet-metal hoods and has an extensive anti-drilling conductor track structure with at least one continuous anti-drilling conductor track;

wherein the two sheet-metal hoods and the anti-drilling foil are adhesively bonded to one another over their full surface area to form a composite cover.

8. The protective hood according to claim 7, wherein the sheet-metal hoods are each designed as a deep-drawn part or a bent sheet-metal part.

9. The protective hood according to claim 7, wherein the anti-drilling foil has a connection lug which projects out of the protective hood.

10. The protective hood according to claim 7, wherein the two sheet-metal hoods each have feet for fastening on a printed circuit board, wherein the feet of the outer sheet-metal hood engage in each case completely over the feet of the inner sheet-metal hood.

11. The protective hood according to claim 10, wherein the feet of the inner sheet-metal hood have the electrical connection contacts.

12. The protective hood according to claim 11, wherein the connection contacts are formed by tabs which are cut out from the standing surface of the feet and project beyond the standing surface.

13. The protective hood according to claim 7, wherein the protective hood has electrical connection contacts for making electrical contact with a printed circuit board.

14. The protective hood according to claim 7, wherein the anti-drilling foil has a single-layer or a multilayer anti-drilling conductor track structure.

* * * * *